United States Patent [19]
Biggs

[11] Patent Number: 5,427,337
[45] Date of Patent: Jun. 27, 1995

[54] DUAL DRIVE MECHANISM AND RELATED METHODS

[75] Inventor: Eugene S. Biggs, Bountiful, Utah

[73] Assignee: MD, Inc., Salt Lake City, Utah

[21] Appl. No.: 6,026

[22] Filed: Jan. 15, 1993

[51] Int. Cl.⁶ .......................................... F16M 11/00
[52] U.S. Cl. ................................... 248/15.7; 74/459;
248/405; 297/344.12
[58] Field of Search ................. 248/188.4, 161, 405,
248/404, 157; 297/345, 348; 108/147; 74/459

[56] References Cited

U.S. PATENT DOCUMENTS

| | | | |
|---|---|---|---|
| 597,621 | 1/1898 | Russell | 74/459 X |
| 1,242,109 | 10/1917 | Koken | 248/405 |
| 2,152,518 | 3/1939 | Wolf | 74/459 U X |
| 2,924,265 | 2/1960 | Himka | 74/459 X |
| 3,643,521 | 2/1972 | Nilsson | 74/459 |
| 4,000,874 | 1/1977 | Finley | 248/906 X |
| 4,509,382 | 4/1985 | Colautti | 248/405 X |
| 4,576,352 | 3/1986 | Ogden | 248/188.4 |
| 4,752,102 | 6/1988 | Rasmussen | 297/345 X |
| 4,842,233 | 6/1989 | Rusin | 297/348 X |
| 5,078,357 | 1/1992 | Mosetich | 248/157 |

FOREIGN PATENT DOCUMENTS 2201185 8/1973 Germany .................... 248/405

*Primary Examiner*—J. Franklin Foss
*Attorney, Agent, or Firm*—Foster & Foster; Lynn G. Foster

[57] ABSTRACT

A dual drive mechanism for medical/dental chair comprising a single motor drive and a pair of linearly driven shafts. In one embodiment, the dual drive mechanism provides a self-locking, reliable and easily maintainable system for vertically displacing one portion of a medical/dental chair relative to another portion of the medical/dental chair. In other embodiments, the dual drive mechanism drives both shafts in a single direction to increase drive power, engages each shaft to a common part and drives both shafts in opposite directions to tilt or rock the common part and employs shafts having different drive ratios to drive separate parts at separate rates.

31 Claims, 8 Drawing Sheets

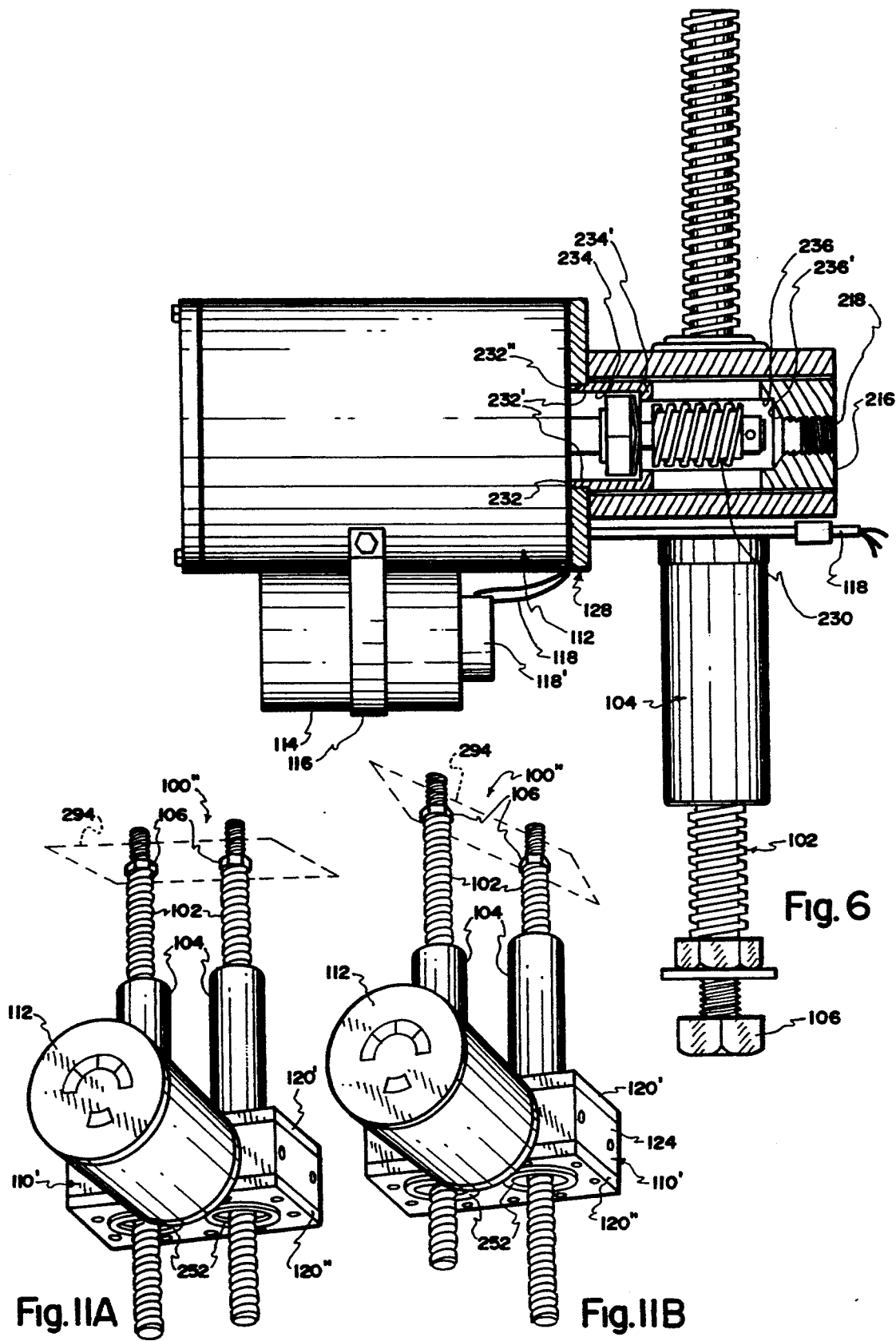

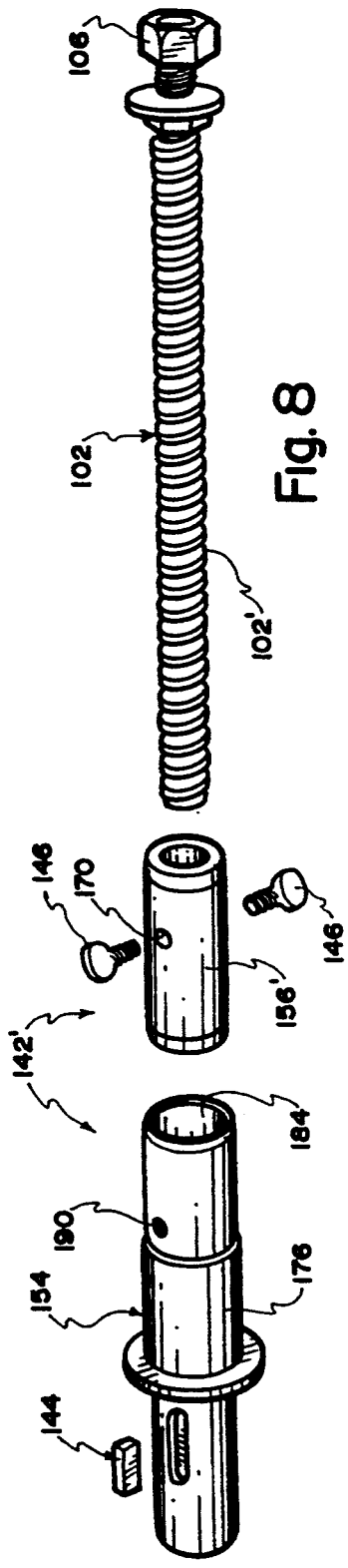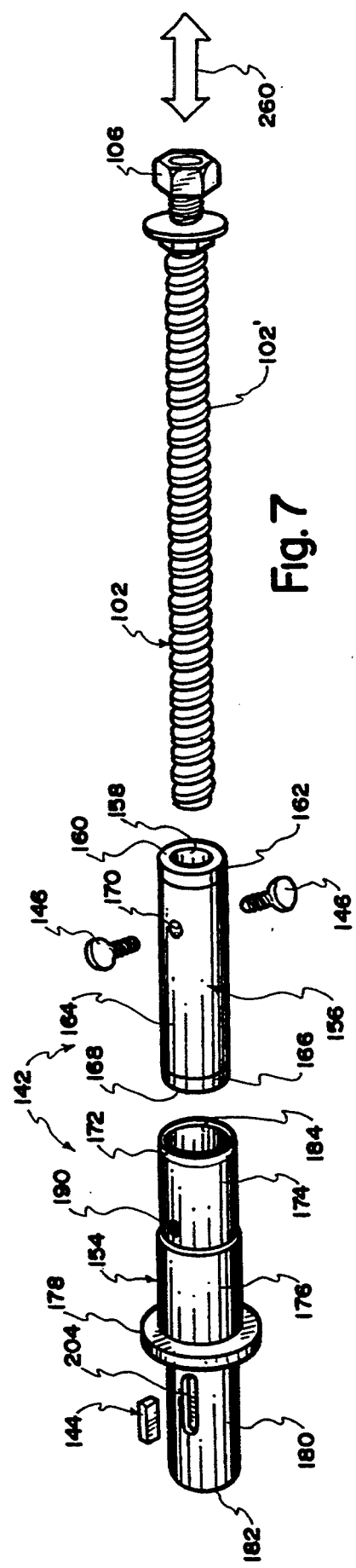

DUAL DRIVE MECHANISM AND RELATED METHODS

FIELD OF INVENTION P

This invention relates to medical and dental chairs and in particular to drive mechanisms for lifting, lowering, leveling, and tilting medical and dental chairs.

DESCRIPTION OF RELATED ART

Mechanized medical and dental chairs and drive mechanisms for such chairs are widely known in the art. Types of medical and dental chair drive mechanisms comprise gear motors, hydraulic systems and chains and sprockets. Problems associated with such drive mechanisms are directly related to demanding safety and performance requirements for chair functions such as those emanating from extended vertical lift distances and wide ranges of patient weight. While as many as four or more drive mechanisms may be used on a single medical and dental chair, typically the more demanding requirements must be met by vertical lift drive systems, and, as such, will be the object of primary descriptive focus in the following description of related art.

Medical and dental chair vertical drive systems must be compact to fit within the confines of the base of a medical or dental chair. The range of vertical travel of each vertically moving part of each medical or dental chair is generally long relative to the vertical distance available for compacting the associated drive system within the base of the chair when the chair is disposed at its lowest height.

Additional critical design requirements address problems related to variations in rate of chair travel as the chair is raised or lowered, safety of an occupant in the chair should a critical part break, utility of the drive system in the face of a failure of a part within a drive chain and difficulty of service and cost related to maintaining the system.

Gear motor based systems, comprising systems which lift and lower medical and dental chairs in a manner similar to that of a car jack, are well known in the art. In such systems, downward transmitted forces require on the order of eight times more force to move the chair the first two inches from the bottom than the force required to move the chair through the highest two inches. To compromise for the increased forces required at lower heights, variable gain gearing systems have been introduced. However, such variable gain systems add complexity and produce variable rate drives which are often undesirable.

Hydraulic systems are more linear in operation than the car-jack-like systems described above, but tend to start slowly and increase speed as the chair is driven over a long adjustment. Also, hydraulic systems are subject to leakage and resulting frequent maintenance and servicing requirements.

Another system which is relatively linear in drive force requirements and driving speed utilizes chains and sprockets. While such systems are nearly linear in speed of operation over a range of heights, mechanical complexity and safety of the occupant of the chair when a chain or sprocket breaks is of significant concern.

Yet another system used in vertically adjusting chair height is a single shaft gear drive which combines a single gear shaft and a motor drive. However, to realize adequate travel using a single shaft, a high pitch or a multiple pitch thread on the shaft must be used. When a chair is disposed at high pitch points on the shaft and the shaft is stopped, the chair tends to creep and drift downward.

BRIEF SUMMARY AND OBJECTS OF THE INVENTION

In brief summary, this novel invention alleviates known problems related to drive mechanisms for medical and dental chairs. In an embodiment related to vertical medical and dental chair drive, a dual drive mechanism urges a pair of threaded shafts in opposite directions. The first threaded shaft is non-rotatably connected to a movable portion of the chair while the second threaded shaft is likewise connected to a stationary portion of the chair to, in combination, provide a vertical drive for the movable portion of the chair.

The dual drive mechanism comprises two opposing gears driven by a single gear disposed on an axle of a motor, each opposing gear is integrally connected to a shaft drive assembly which is circumferentially disposed about a threaded shaft to move the shaft linearly as the drive assembly rotates. The opposing gears are contained within a housing to which a motor mounting plate is affixed to for attaching the gear motor to the housing. As the motor drives the gears and shaft drive assembly and urges the threaded shafts in opposite directions to vertically move portions of the chair, the housing is likewise moved, but at a slower rate than the chair.

In a preferred embodiment, the shaft drive assembly comprises a hollow shaft gear case integrally attached on an outer surface to one of the opposing gears and containing a gear nut through which one threaded shaft is inserted and by which the threaded shaft is linearly displaced as the gear nut and hollow shaft gear case are rotated. Hollow shaft gear cases are known. However, the length of each gear nut is shortened relative to the length of the hollow shaft gear case to permit travel of each threaded shaft to be longer than the length of the threaded shaft less the length of the gear case, thereby permitting extended travel of each threaded shaft relative to the length of each hollow gear case. In this manner, vertical travel of the chair is likewise extended to more than the distance of a standard single threaded shaft driven chair which comprises a gear nut of the same length as an associated hollow gear case.

Preferably, the gear nuts are made of self-lubricating synthetic resinous material, such a nylon. Even so, due to pressure and heat generated by extreme loads borne by the gear nut and the threaded shaft traveling relative to the gear nut binding can result. To alleviate binding, a novel wicking lubricant applicator is disposed within each hollow shaft gear case to lubricate the threaded shaft/gear nut interface and thereby reduce friction, resultant heat generation, expansion of parts and ultimate failure of the drive system. In addition, a portion of the outer surface of each gear nut is removed to permit expansion of the outer surface of the gear nut within the hollow shaft gear case to reduce the interior expansion and interiorly developed forces due to expansion of the gear nut and thereby alleviate resultant likelihood of binding against the associated threaded shaft.

In the vertical lift embodiment of the invention, the threaded shafts are disposed to travel in opposite directions as the motor drives the chair vertically. In a different embodiment of the invention for other chair manipulating applications, the threaded shafts are disposed to be driven in the same direction, thereby doubling lift capacity of the dual drive mechanism.. In still another embodiment, the threaded shafts are driven in opposite directions by the dual drive mechanism, but are similarly disposed relative to the housing to couple to a device in substantially the same plane. So disposed, movement of the dual drive mechanism tilts the device. When the dual drive mechanism is driven cyclicly in alternate directions the device is rocked.

In yet another embodiment, the threaded shafts are interfaced to separate devices to perform different functions at the same time when actuated by a common dual drive mechanism. In such a case, a different pitch on the threads of each shaft changes the rate of linear travel of one threaded shaft relative to the other threaded shaft.

Using a single motor and central gear to drive two separate threaded shafts provides a system which is easily maintained and serviced. To facilitate operation in case of motor failure, access is provided to an end of the axle shaft of the motor wherein a screw slot is provided such that a screw driver or power drill is used to turn the axle to actuate and move the chair drive the like when power or motor failure occurs.

Accordingly, it is a primary object to provide a dual drive mechanism for use in a medical or dental chair comprising a pair of threaded shafts linearly driven to move one portion of the chair relative to another portion of the chair.

It is an important object of the invention to provide a drive system to drive the threaded shafts vertically in opposite directions to reposition one portion of the chair vertically relative to another portion of the chair.

It is another primary object to drive each threaded shaft linearly by fixing one end of each shaft against rotation and rotating a circumscribing gear nut about each threaded shaft.

It is an object to provide a dual drive mechanism which drives a pair of opposing gears, each opposing gear being rotationally associated with each gear nut such that each gear nut and associated opposing gear rotate at the same angular rate.

It is still another primary object to provide a drive system which drives each opposing gear with a single central gear driven by an axle of a motor.

It is an object to provide a housing for the opposing gears and central gear interface.

It is another important object to provide a vertical drive embodiment of the invention in which the housing floats relative to exterior chair connections of threaded shafts such that the housing travels relative to the exterior connections and the combined linear travel of one oppositely directed end of the threaded shafts relative to the other oppositely directed end of the threaded shafts travels at a higher linear rate than the rate of travel of the housing.

It is still another important object to provide a motor gear and gear nuts which are pitched to drive threaded shafts and yet be self locking when not being driven.

It is an object to provide a gear nut which is self-lubricating.

It is another object to provide an auxiliary lubricating system for the gear nuts and threads on the threaded shafts.

It is an object to provide a tool accessible end on the motor-axle whereby the axle is rotated without motor power to drive the threaded shafts and thereby manually move one portion of the chair relative to another portion.

It is an object to provide a gear nut having a length which is shorter than the hollow shaft gear case in which the gear nut is disposed to permit greater length of travel of the threaded shafts relative to the length of the hollow shaft gear case.

It is an object to provide gear nuts disposed in hollow shaft gear cases to drive a pair of associated threaded shafts in the same linear direction.

These and other objects and features of the present invention will be apparent from the detailed description taken with reference to accompanying drawings.

BRIEF DESCRIPTION OF THE DRAWINGS

FIG. 6 is a section taken along lines 6—6 of FIG. 2;

FIG. 7 is a perspective of an exploded shaft drive assembly showing a first long gear nut;

FIG. 8 is a perspective of an exploded shaft drive assembly showing a second short gear nut;

FIG. 11A is a perspective of a dual drive mechanism with threaded shafts connectable at the same end and disposed at the same height but having the parts of the dual drive mechanism oriented such that the shafts move in opposite directions;

FIG. 11B is a perspective of the dual drive mechanism of FIG. 11A with the threaded shafts moved to different heights;

DETAILED DESCRIPTION OF THE ILLUSTRATED EMBODIMENTS

In this description, the term proximal is used to indicate the segment of the device normally closest to the object of the sentence describing its position. The term distal refers to the other end. Reference is now made to the embodiments illustrated in FIGS. 1–13 wherein like numerals are used to designate like parts throughout.

Figure 1:
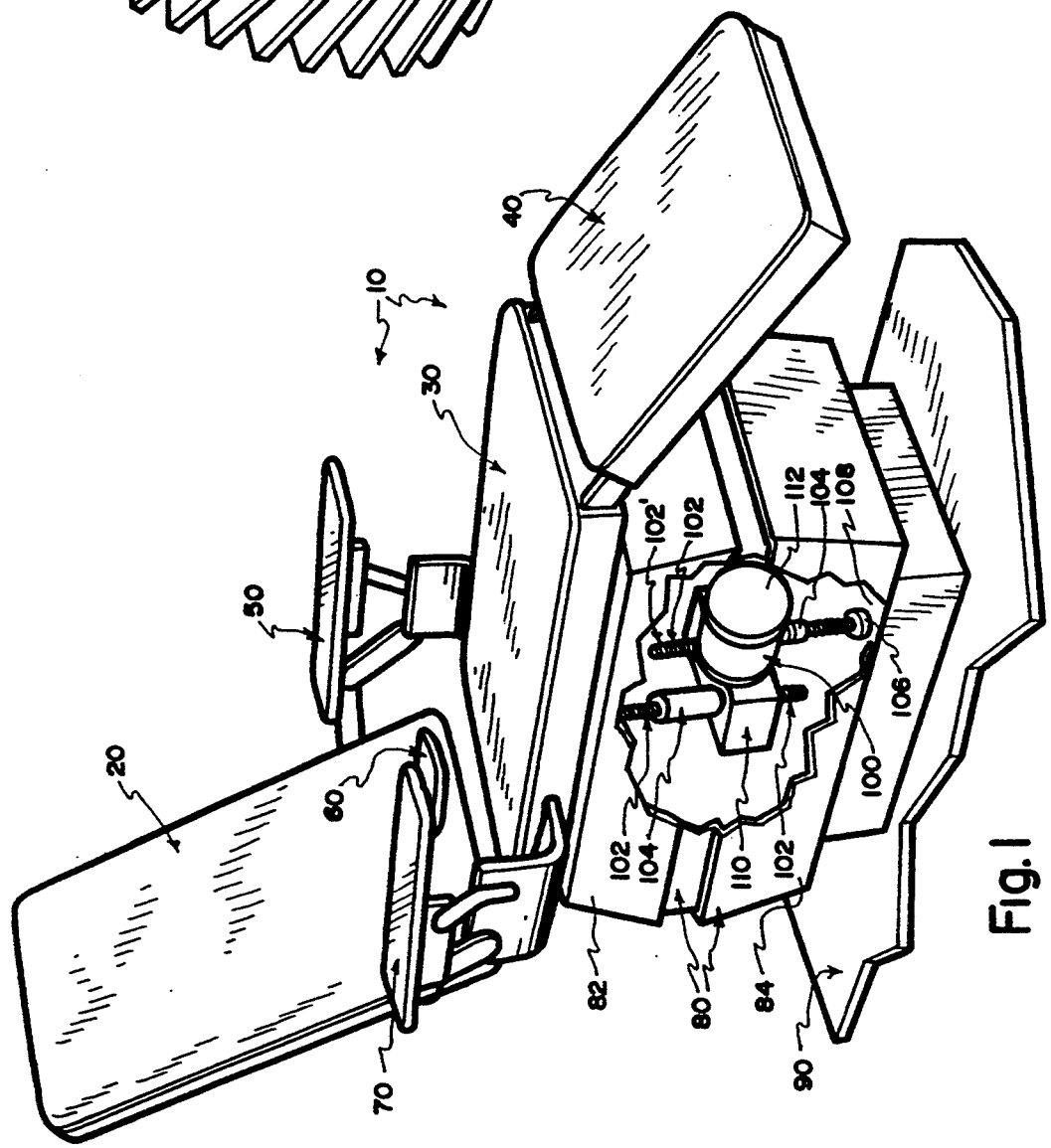
FIG. 1 is a perspective of a medical/dental chair with parts removed to show a dual drive mechanism for driving a portion of the chair vertically.

An example of a medical/dental chair 10 is seen in FIG. 1. Generally such chairs comprise a back support 20, a seat 30, a leg rest and foot support 40, arm rests 50 and 60, and an instrument support station 70. Disposed beneath seat 30 of chair 10 is a base or pedestal 80 upon which the chair is affixed to rests upon flooring 90. Commonly each base 80 is separable into at least two parts 82 and 84 so that seat 30 is vertically adjustable.

In FIG. 1, a portion of pedestal 80 is removed to permit vertical dual drive mechanism 100, disposed beneath seat 30, to be seen. While only the one vertical dual drive mechanism 100 is seen in FIG. 1, it is well known in the art to mechanically power and thereby control movement and position of back supports 20, seat 30, leg support 40, arm rests 50 and 60, and instrument support station 70 relative to adjoining parts of chair 10. Other dual drive mechanisms which are within the scope of this invention and which are used for such powered movement are described in detail hereafter.

Figure 2:
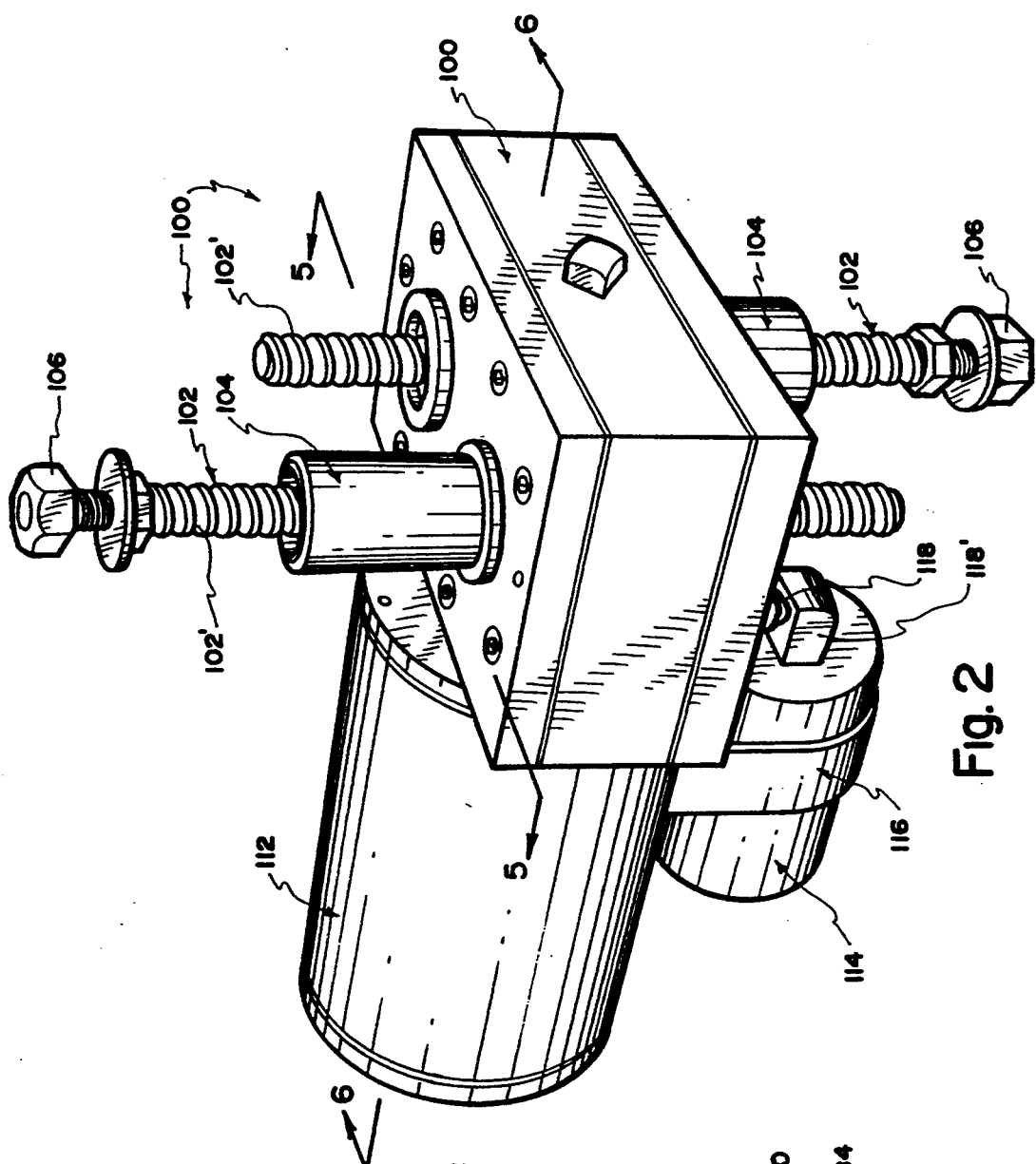
FIG. 2 is a perspective of the dual drive mechanism seen in FIG. 1.

Better seen in FIG. 2, dual drive mechanism 100 comprises a pair of threaded shafts or jack shafts, commonly numbered 102, each disposed within a shaft drive assembly 104. Each shaft 102 comprises an exteriorly exposed threaded surface 102' and an end 106 which is affixed to a an object to curb rotation of shaft 102. As an example, one end 106 at site 108 is seen affixed to base part 84 in FIG. 1. Notwithstanding, each end 106 is so affixed to assure that shaft 102 does not turn as an associated shaft drive assembly 104 circumferentially disposed about shaft 102 rotates in communication with threaded surface 102'.

Dual drive mechanism 100 further comprises a housing 110, a motor 112, a capacitor 114 which is firmly attached to motor 112 by bracket 116 and electrical wiring 118 connected to capacitor 114 through a protective boot 118' made from flexible synthetic electrically insulating material such as rubber. While variously sized motors may be used for different chair applications, for a vertical chair drive, motor 112 may be a one-third horsepower motor such as Motor Model Number K37MYA283218 from Emerson Motor Division, Saint Louis, Mo., U.S.A. Capacitor 114 may be a 55 to 70 microfarad capacitor, depending upon starting torque requirements of motor 112.

Housing 110 encloses an interface between portions of the shaft drive assemblies 104 and gearing associated with motor 112. Each shaft drive assembly 104 rotates when driven by motor 112. Details of the interface are seen in FIGS. 3–6. As seen in FIG. 5, dual drive mechanism 100 comprises shaft drive assembly 104 for each of two threaded shafts 102.

Figure 3:
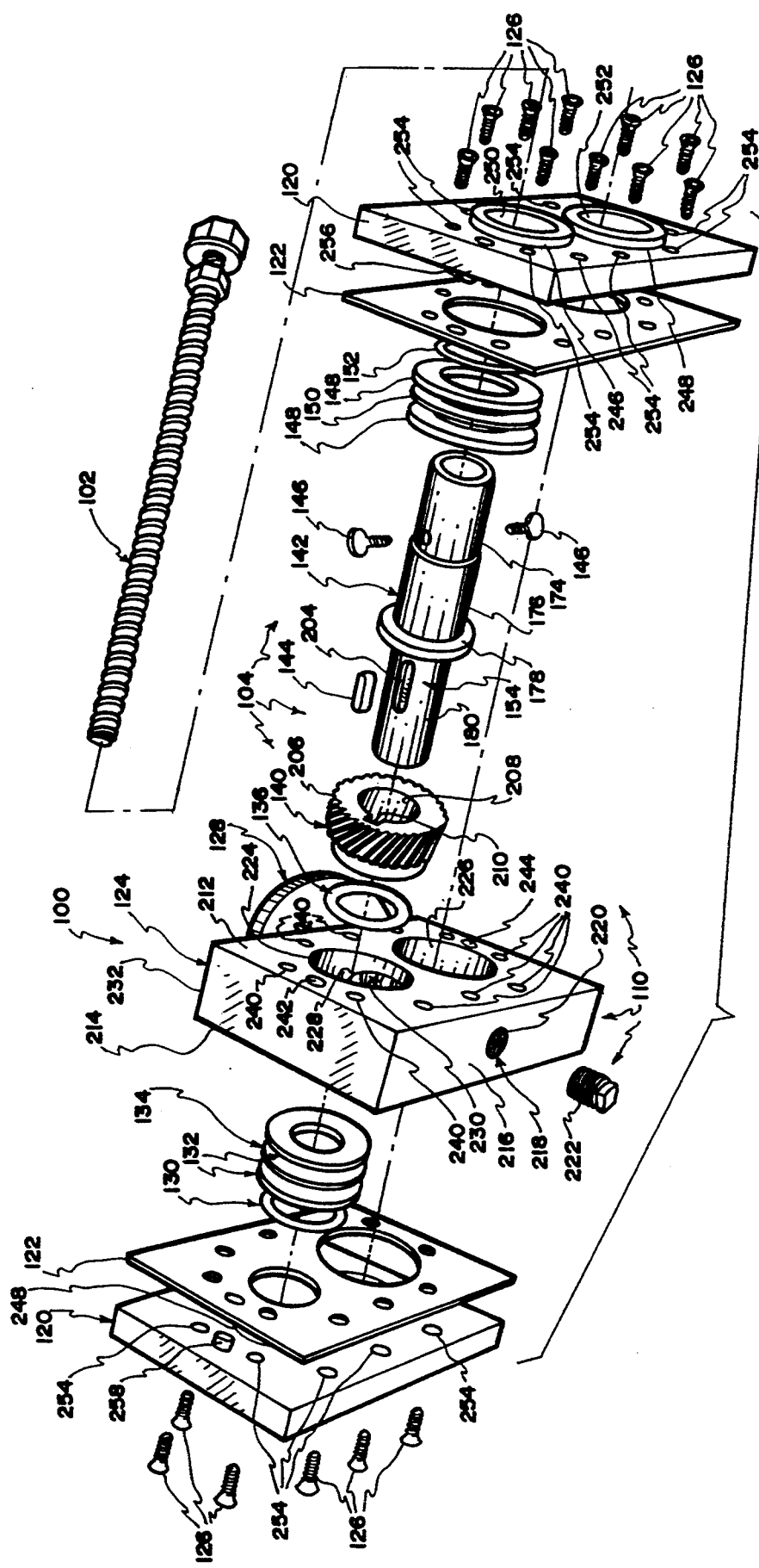
FIG. 3 is an exploded perspective of a portion of the dual drive mechanism seen in FIG. 2 with some parts removed for clarity of presentation.

An exploded view of housing 110 and one shaft drive assembly 104 is seen in FIG. 3. The second shaft drive assembly 104 seen in FIG. 5 is removed for clarity of presentation of the one shaft drive assembly 104 in FIG. 3.

In dual drive mechanism 100, housing 110 comprises, as seen in FIG. 3 from left to right, a first gear case cover plate 120, a first gear case cover gasket 122, a centrally disposed motor gear block 124, a second gear case cover gasket 122, and a second gear case cover plate 120. Each gear case cover plate 120 and gear case cover gasket 122 is identical to the other gear case cover plate 120 and gear case cover gasket 122, but rotated 180° relative to the other plate 120 and gasket 122 to accommodate oppositely directed drive of each shaft drive assembly 104. Housing 110 further comprises a plurality of screws 126 for attaching each cover plate 120 and gasket 122 to block 124. Housing 110 also comprises a motor mounting plate 128 attached to one side of block 124.

Also as viewed from left to right, shaft drive assembly 104 comprises an O-ring 130, a first thrust washer 132, a thrust bearing 134, a second thrust washer 132, an O-ring 136, a helical gear 140, a drive shaft assembly 142, a lock pin or key 144, a pair of retainer screws 146, a first thrust washer 148, a thrust bearing 150, a second thrust washer 148 and an O-ring 152.

As seen in FIG. 7, drive shaft assembly 142 comprises a hollow drive shaft 154, tubular gear nut 156 and lock pin or key 144 and retainer screws 146, as disclosed above. Within the scope of the invention, drive shaft assembly 142 may also comprise a wicking assembly which is seen in FIG. 5 and described in detail hereafter.

Gear nut 156 comprises a hollow-cylindrical shape with an internally, longitudinally disposed threaded surface 158 which conforms to threaded surface 102' of the inserted threaded shaft 102. On one end, gear nut 156 comprises blunt end 160 from which an externally disposed surface ring 162 extends medially to communicate with an external medial surface section 164. Medial surface section 164 extends longitudinally to communicate with a second surface ring 166 which is truncated at a second blunt end 168. The transverse radial diameter of medial surface section 164 is reduced relative to the radial diameter of each surface ring 162 and 166 for purposes which are described in detail hereafter. Gear nut 156 also comprises a pair of diametrally opposed holes 170 (only one of which is seen in FIG. 7) through medial surface section 164. The purpose and function of each hole 170 are described in detail hereafter. Gear nut 156 is preferably made from a shape retaining, self-lubricating material such as nylon.

Hollow drive shaft 154 comprises a first blunt end 172 from which a cylindrical outer surface 174 extends medially to an intersection or shoulder 175 with a slightly raised cylindrical surface 176. Distal to surface 174, a retaining ring 178 extends radially from surface 176. Extending longitudinally from a side of retaining ring 178 distal to surface 176, a cylindrical surface 180 extends to a blunt end 182. As best seen in FIG. 5, hollow drive shaft 154 comprises a longitudinally disposed internal surface 184 which extends medially from blunt end 172 to an intersection with reduced internal surface 186 at annular ledge or shoulder 188. The radial diameter of surface 184 is sized to snugly accept rings 162 and 166 which are of essentially the same transverse diameter. Hollow shaft 154 comprises a pair of diametrally opposed holes 190 which are spaced longitudinally from annular ledge 188 such that holes 190 juxtapose holes 170 in gear nut 156 when gear nut 156 is fully inserted into shaft 154 such that blunt edge 168 is disposed against annular ledge 188. Each hole 190 is threaded to permit a screw 146 to be tightly screwed into hole 190 and through hole 170 to securely affix gear nut 156 to shaft 154.

As seen in FIG. 5, disposed between blunt end 160 of gear nut 156 and blunt end 172 of shaft 154 is a wicking assembly 192. Wicking assembly 192 comprises an outwardly disposed retaining washer 194, a lubricant filled cylinder 196 and an inwardly disposed retaining washer 198. Disposed within internal surface 184 of hollow shaft 154 is a radial groove 200 which captures retaining washer 194. Likewise a second radial groove 202 is disposed to capture retaining washer 198. When wicking assembly is assembled, cylinder 196 is filled with lubricant and disposed between captured retaining washers 194 and 198. Washers 194 and 198 are preferably made from shape retaining synthetic resinous material, such as nylon. Cylinder 196 is preferably made of a lubricant absorbing material such as felt.

Referring once more to FIG. 7, shaft 154 is seen to comprise a longitudinal channel or keyway 204 disposed along surface 180 proximal to retaining ring 178 between retaining ring 178 and blunt end 182. Channel 204 is sized to snugly receive a radially inwardly directed portion of lock pin 144 when lock pin 144 is longitudinally oriented relative to shaft 154. When lock pin 144 is disposed in channel 204, a substantial portion of lock pin 144 extends radially outward above surface 180 for a purpose described hereafter.

Figure 13:
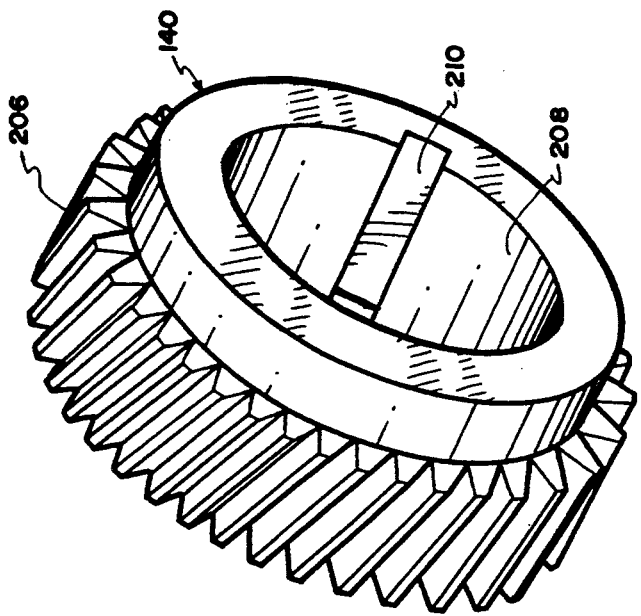
FIG. 13 is a perspective of one of the orthogonally disposed gears seen in FIG. 4.

As seen in FIGS. 3 and 13, helical gear 140 comprises a plurality of helically oriented teeth 206. Teeth 206 are pitched to receive and be driven by an orthogonally disposed drive gear, such as a worm gear. Helical gear 140 comprises an interiorly disposed cylindrical longitudinal surface 208. The transverse radius of surface 208 is sized to snugly fit over surface 180 of shaft 154. A longitudinal slot 210 is disposed in surface 208 and comprises a size to function as a keyway for capturing the outwardly extending portion of lock-pin 144 when lock pin 144 is disposed in channel 204 as seen in FIG. 5. Helical gear 140 is preferably made from tool grade, shape retaining, synthetic resinous material, such a nylon. Such helical gears are currently available in commerce.

As best seen in FIG. 3, O-ring 136 is sized to snugly slide over surface 180 and be disposed against a distal side of helical gear 140 relative to retaining ring 178 to assure capture of lock pin 144 in channel 204 of shaft 154 and slot 210 of helical gear 140. Adjacent to O-ring 136 and distal from helical gear 140, disposed in seriatim, are second thrust washer 132, thrust bearing 134, first thrust washer 132 and O-ring 130. Each washer 132, bearing 134 and O-ring 130 comprise an internal diameter which permits a snug fit over surface 180 of shaft 154.

In similar fashion, first thrust washer 148, thrust bearing 150, second thrust washer 148 and O-ring 152 are arranged in seriatim and are sized to fit over surface 176 of shaft 154. The O-rings are preferably made from resilient, wear resistant synthetic material. Thrust washers and bearings are commercially available in the art.

As best seen in FIG. 5, block 124 is rectangularly shaped and comprises one first shaft drive assembly 104 access side 212 juxtaposed another second shaft drive assembly 104 access side 214. A long side 216 interposed between sides 212 and 214 comprises an access port 218, the purpose for which is described in detail hereafter. Access port 218 comprises an interior surface 220 threaded to receive a manually removable plug 222.

Block 124 also comprises a pair of parallel circular through holes 224 and 226 through sides 212 and 214. The diameters of holes 224 and 226 are sufficiently large to pass the largest of the previously mentioned O-rings 130, 136, and 152, thrust washers 132 and 148, thrust bearings 134 and 150, helical gear 140 and shaft 154. Interposed between holes 224 and 226 is an orthogonally disposed hole 228. Holes 224 and 226 are disposed sufficiently close one to the other that hole 228 communicates with both holes 224 and 226 and that a worm or other longitudinally disposed gear 230 simultaneously provides an orthogonally disposed drive for helical gear 140 disposed in hole 224 and another helical gear disposed in hole 226. While only one shaft drive assembly 104 is seen in line with hole 224 in FIG. 5, it should be understood that the other shaft drive assembly 104 is disposed in hole 226 to complete assembly of the dual drive mechanism 100.

Block 124 further comprises a second long side 232 juxtaposed side 216. As best seen in FIG. 6, motor mounting plate 128 is securely affixed to side 232 and comprises an access hole 232" for gear 230 and a portion 232' of block 124 which is machined as a ring for insertion into hole 232" of mounting plate 128. In seriatim from side 232, block 124 comprises a relatively large diameter bore hole 234 which terminates at an annular ledge 234'. From ledge 234', block 124 comprises a medially extending second smaller bore hole 236. Bore hole 236 terminates at an annular ledge 236'. From ledge 236' still smaller bore hole 218 provides access from side 216 as described above. Gear 230 is axially mounted on motor 112 and inserted into bore hole 236 as seen in FIG. 6.

Figure 4:
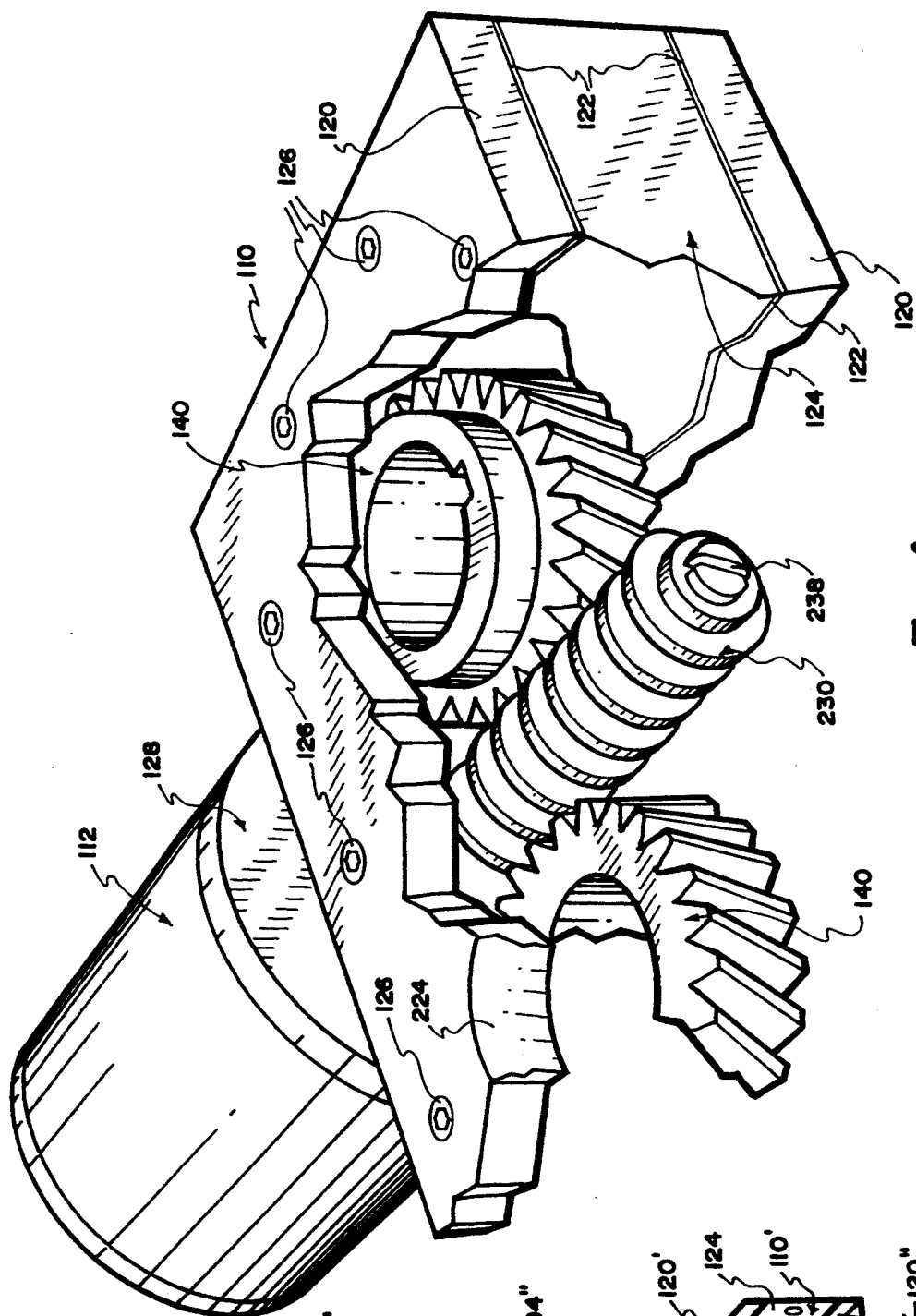
FIG. 4 is a enlarged perspective of a portion of the dual drive mechanism of FIG. 2 with parts removed to show a slot at the end of a threaded motor axle and engagement of a worm gear on a threaded motor axle with a pair of orthogonally disposed helical gears.
Figure 5:
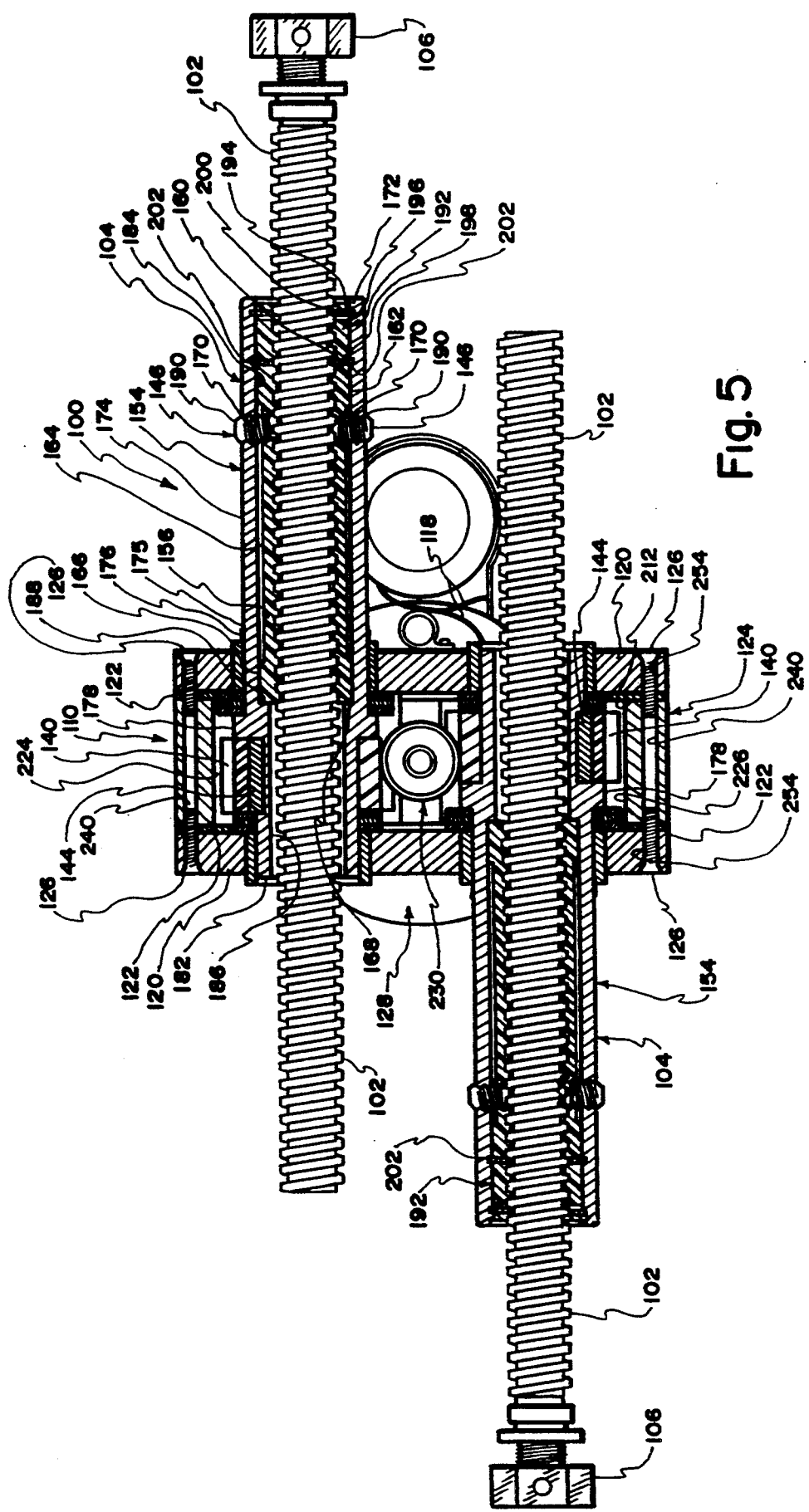
FIG. 5 is a section taken along lines 5—5 of FIG. 2.

Reference is now made to FIG. 4 wherein a large portion of block 124 and shaft drive assembly 104 are removed for a clearer presentation of the relationship among longitudinally disposed gear 230 to each helical gear 140. Motor 112 is connected to block 124 through mounting plate 128. Longitudinal or worm gear 230 extends from a powered connection to motor 112 through mounting plate 128 to communication with each helical gear 140 disposed in block 124 of housing 110. As worm gear 230 is rotated, each helical gear 140 is likewise rotated. First helical gear 140 is rotated in a first direction and second helical gear 140 is rotated in the direction opposite rotation of the first gear 140.

Worm gear 230 comprises a slot 238 in the distal end of the axle of gear 230 relative to motor 112. As seen in FIG. 3, access is provided to slot 238 via access port 218 by removing plug 222. A screw driver blade (not shown) is inserted into slot to manually turn gear 238 to rotate gears 140 when motor 112 power is unavailable. In this manner, an adjustment is manually made when motor or power failure otherwise causes the chair adjustment to be unworkable.

Block 124 further comprises a plurality of threaded holes 240 in each access side 212 and 214 (but only seen in side 212) whereby one gear case cover plate 120 and one gear case cover gasket 122 are releasibly attached to side 212 and gear case cover plate 120 and gear case cover gasket 122 are likewise attached to side 214. Access side 212 also comprises a pair of guide holes 242 and 244 to provide alignment for the associated gear case cover plate 120 and one gear case cover gasket 122. Access side 214 comprises like holes in a similar hole distribution, but the holes are not shown in FIG. 3.

Each gear case cover gasket 122 comprises medially disposed holes for parts access to through holes 224 and 226 in block 124, guide holes 244 and threaded holes 240. More importantly, gasket 122 provides a seal about exposed edges of block 124 and associated gear case cover plate 120. Gasket 122 is preferably made from flat gasket material which is widely available in the art.

Each gear case cover plate 120 comprises two medially disposed through holes 246 and 248. Hole 246 is disposed to be aligned with hole 224 when second gear case cover plate 120 is affixed to block 124 as seen in FIG. 3. Hole 248 is disposed to be aligned with hole 226 when second gear case cover plate 120 is affixed to block 124. Each plate 120 comprises a bushing 250, permanently and rigidly affixed within hole 246. Bushing 250 comprises an internal diameter which provides a rotational bearing for surface 176 of shaft 154. Each plate 120 also comprises a bushing 252, permanently and rigidly affixed within hole 248. Bushing 252 comprises an internal diameter which provides a rotational bearing for surface 180 of shaft 154. Bushings 250 and 252 are preferably made from brass, but may be of any long lasting bearing material compatible with surfaces 176 and 180. Unless otherwise specified, other parts of each dual drive mechanism are made from tool grade steel.

Each gear case cover plate 120 also comprises a plurality of through holes 254 forming a pattern essentially the same as the pattern of holes 240 in block 124 such that screws 126 are inserted therethrough and screwed tight in holes 240 to affix gear case cover plate 120 and associated gear case cover gasket 122 to block 124. Each gear case cover plate 120 also comprises a pair of alignment pins 256 and 258 in common alignment with guide holes 242 and 244 of block 124. Alignment pins 256 and 258 are sized to snugly insert into guide holes in block 124 to assure alignment of through holes 246 and 248 in each gear case cover plate 120 with associated holes 224 and 226 in block 124.

As is also seen in FIG. 3, first gear case cover gasket 122 and first gear case cover plate 120 are used for covering access side 214 and second gasket 122 and second gear case cover plate 120 are used for covering access side 212, but arranged at supplementary angles as the two shaft drive assemblies 104 are oriented in opposite directions relative to one another for applications such as vertically driving a chair. In other applications, such as those seen in FIGS. 10A and 10B where two shaft drive assemblies are oriented in the same direction, the gear case cover gasket and gear case cover plate used to cover access side 212 are not respectively the same as the gear case cover gasket and gear case cover plate used to cover access side 214 as described in detail hereafter.

Referring once more to FIGS. 3, 5, 6 and 7, dual drive mechanism 100 is assembled by attaching motor mounting plate 128 to side 232 of block 124 and thereat affixing plate 128 to block 124 with flat head screws or the like. Gear 230 is inserted into hole 236 and motor 112 and capacitor 114 are attached to mounting plate by mounting procedures defined by the manufacturer for each motor selected for use with the invention.

As seen in FIG. 3, lock pin 144 is displaced into channel 204 in surface 180 of shaft 154. Helical gear 140 with slot 210 aligned with lock pin 144 is displaced upon surface 180 over lock pin 144 and channel 204. O-ring 136 is displaced over surface 180 to aid in containment of lock pin 144 in channel 204 and slot 210. In seriatim, second thrust washer 132, thrust bearing 134, first thrust washer 132 and O-ring 130 are displaced onto surface 180. Also in seriatim, first thrust washer 148, thrust bearing 150, second thrust washer 148 and O-ring 152 are displaced onto surface 176 of shaft 154. This assembled portion of shaft drive assembly 104 is displaced into hole 224 of block 124 such that helical gear 140 engages gear 230. An oppositely directed, second assembled configuration, not shown in FIG. 3 but seen in FIG. 5, is oriented as a transverse mirror image of the above described assembly and displaced into hole 226 such that second helical gear 140 also engages gear 230.

Gasket 122 is positioned against access side 212 and alignment pins 256 and 258 of second gear case cover plate 120 are inserted into guide holes 242 and 244, respectively. Second cover plate 120 is firmly but releasibly affixed thereat by the plurality screws 126 respectively disposed into holes 254 and 240.

Referring to FIG. 7, gear nut 156 is displaced into internal surface 184 of hollow shaft 154. One screw 146 is inserted and tightened into each threaded hole 190 such that a portion of screw 146 is displaced into juxtaposed hole 170 of gear nut 156 to retain gear nut 156 rotationally and longitudinally affixed relative to shaft 154. Note that insertion of gear nut 156 in a first longitudinal direction relative to shaft 154 orients a drive pitch on threads within the gear nut 156 to drive non-rotating threaded shaft 102 in a given linear direction relative to direction of rotation of gear nut 156.

Conversely, insertion of gear nut 156 in a second opposite direction orients the drive pitch on threads within the gear nut 156 to drive the non-rotating threaded shaft 102 in an opposite linear direction. In this manner, one dual drive mechanism 100 is alterable to drive the pair threaded shafts 102 either in the same direction or in opposite directions based upon direction of insertion of gear nut 156 into shaft 154.

Also, assembling each shaft drive assembly 104 a similar manner, but constructing one shaft drive assembly 104' with parallel gear nuts 156 aligned in opposite orientation than shaft drive assembly 104 provides a dual drive mechanism which drives both threaded shafts 102 in the same direction, but with double the force of a single shaft. See FIGS. 10A and 10B.

Once each gear nut 156 is affixed in shaft 154, washer 198 is snapped into groove 202 disposed in internal surface 184 of shaft 154, as seen in FIG. 5. Cylinder 196 is displaced against washer 198 and captured thereat by second washer 194 snapped into groove 200 also disposed in internal surface 184 of shaft 154. Cylinder 196 may be filled with lubricant prior to or after being assembled into shaft drive assembly 104.

As best seen in FIG. 5, when gear nut 156 is assembled within internal surface 184 of shaft 154, an air space or void exists between medial surface section 164 and internal surface 184. The void consists of a hollow, cylindrical geometrical space of but a few hundredths of a millimeter in thickness, but of sufficient thickness that transverse expansion of gear nut 156 is outwardly directed toward internal surface 184 rather than internally directed toward shaft 102. It has been found that such relief of the external wall of gear nut 154 permits gear nut not to be affected by friction and pressure which expansively raise the temperature of driving shaft 102 without expanding against surface 102' and binding when expansion is relieved toward internal surface 184. Such a reduction in the transverse radius remarkably reduces binding during chair 10 operation.

To complete an assembly of dual drive mechanism 100, one threaded shaft 102 is inserted and rotationally displaced to a desired position in each shaft drive assembly 104. One end, such as end 106, of each shaft is affixed in non-rotational state relative to drive shaft assembly 142. So affixed, threaded shaft 102, which may be a jack screw, is linearly driven as indicated by arrow 260 as drive shaft assembly 142 rotates.

With each end 106 of each threaded screw 102 affixed in non-rotational orientation, rotation of gear 230, drives each of the helical gears 140 in opposite directions in dual drive mechanism 100 to move each threaded screw 102 in relatively opposite directions. If one end 106 of one threaded screw 102 is affixed to a stationary part of chair 10 and the other end 106 of the other threaded screw 102 is affixed to a movable part of chair 10, the movable part is moved linearly relative to the stationary part as gear 230 rotates.

If the pitch on each threaded screw 102 is the same as the pitch on the other threaded screw 102, the ends 106 move at the same rate relative to housing 110. Note that, in this case, housing also moves relative to ends 106, but at a rate which is one-half the rate ends 106 move relative to each other. For this reason, the pitch of threaded screws 102 is less than the pitch of a single shaft drive threaded screw. Threaded screws pitched at smaller inclines provide a better self-locking attribute for a dual drive mechanism and make the dual drive mechanism far less likely to creep when stopped than a single drive mechanism which is designed to drive a chair part at the same rate over the same distance.

As one who is skilled in the art understands, the pitch on the threaded screws can be the same in a dual drive mechanism or varied to provide different linear drive rates for each threaded screw. Gear 230 may be one thread, to provide a slow, self-locking speed, or two, three or four threads relative to threads on driven gears. The gears driven by gear 230 may be helical gears 140 or worm gears (not shown).

Another embodiment of a drive shaft assembly 142', is seen in FIG. 8 Note that a gear nut 156' seen in FIG. 8 is relatively shorter than the gear nut 156 seen in FIG. 7. Such shortening is possible in a dual drive mechanism comprising shallower pitched threads than a single shaft mechanism which performs a similar function and permits a longer driven extension of threaded shaft 102 relative to the length of shaft 154.

While many other embodiments of dual drive mechanisms may be produced within the scope of the invention, FIGS. 9A, 9B, 10A, 10B, 11A, 11B and 12 illustrate useful medical/dental chair drive mechanisms. The drive configuration seen in FIGS. 9A and 9B comprises dual drive mechanism 100 as described above. Therein, housing 110 is seen to be attached to moveable telescoping parts 270 and 272 which may be used as base parts for chair 10. Telescoping part 270 comprises medially disposed part 274, superiorly extending part 276 and base part 278. Telescoping part 272 comprises medially disposed part 280, superiorly extending part 282 and base part 284.

At an end 106, a threaded shaft 102 which designated is as 286 is non-rotationally attached to a stationary base part 288. At another end 106, another threaded shaft 102 designated as 290 is non-rotationally attached to a part 292 is a portion of a non-rotationally affixed to a movable part of an associated chair (not shown ion FIG. 9A).

Figure 9A:
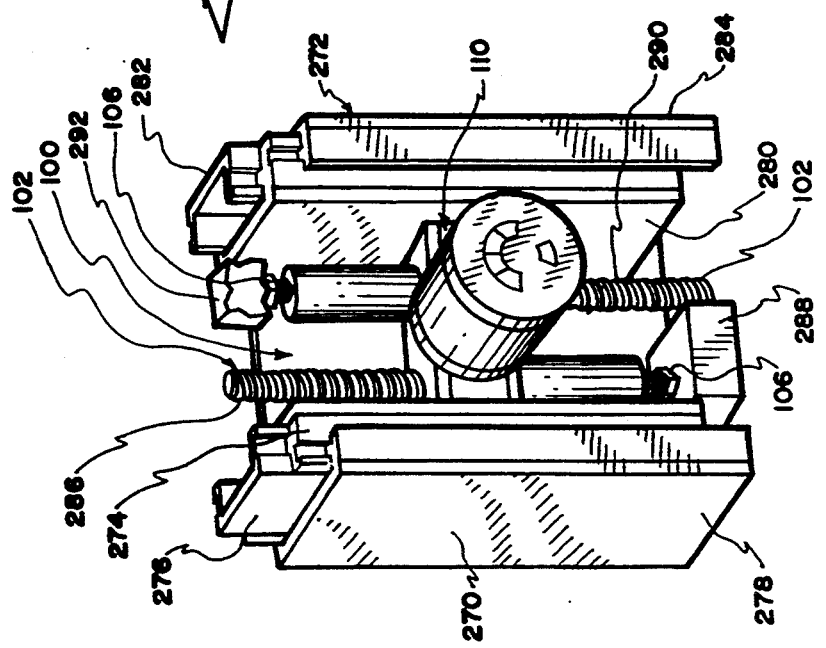
FIG. 9A is a perspective of a dual drive mechanism with threaded shafts extending in opposite directions and connectable at opposite ends.

In FIG. 9A, threaded shafts 286 and 290 are disposed in a compacted or chair lowered position. Note that motor 112 and housing 110 are disposed equidistant from end 106 of shaft 286 and end 106 of shaft 290 and at the vertical mid-point of medially disposed parts 274 and 280.

Figure 9B:
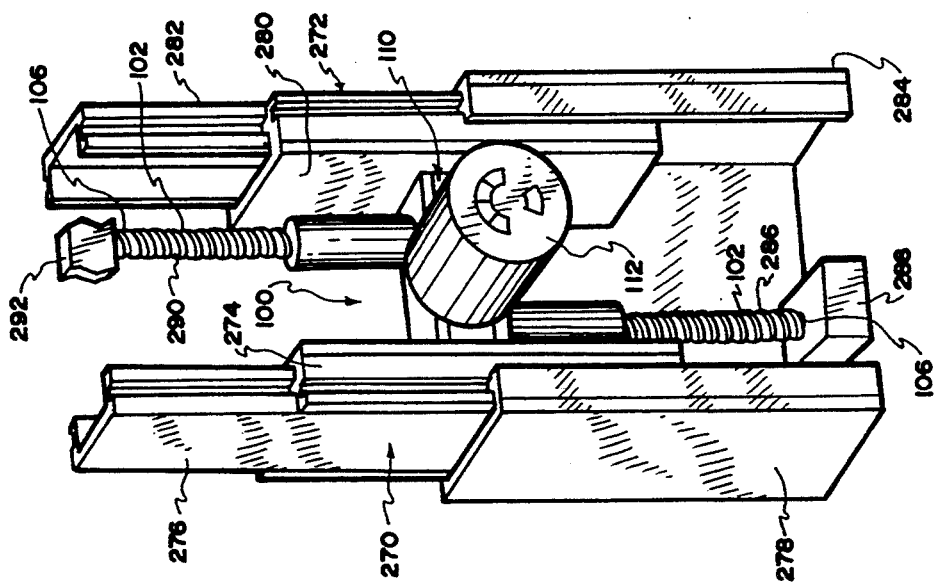
FIG. 9B is a perspective of the dual drive mechanism of FIG. 9A with shafts extended to substantially maximum separation of the ends of the shafts.

In FIG. 9B, shaft 290 is disposed in a near maximally upwardly extended position. As seen in FIG. 9B, motor 112 and housing 110 have also moved vertically upward to remain equidistant from end 106 of shaft 286 and end 106 of shaft 290 to remain at the vertical mid-point of telescoping parts 270 and 272. Superiorly extending parts 276 and 282 have telescopically moved to follow the rate and dislocation of end 106 of shaft 290. From the example of FIGS. 9A and 9B, it is clear that housing 110 and motor 112 move at one-half the rate and are displaced one-half the distance of end 106 of shaft 290. Relatively moving sections of telescoping parts 270 and 272 are geared such that parts 278 and 284 remain stationary, medially disposed parts 274 and 280 follow movement of housing 110 and superiorly extending parts 276 and 282 are geared relative to parts 274 and 280 to move at the same rate as shaft 290.

Figure 10A:
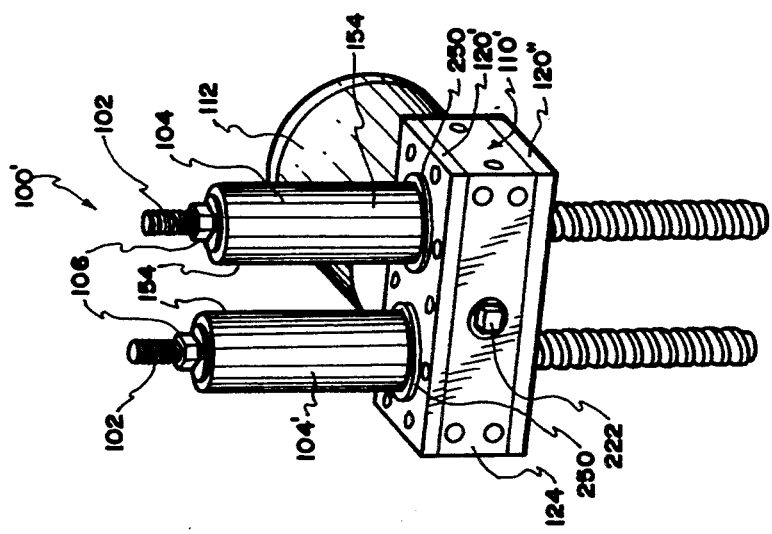
FIG. 10A is a perspective of a dual drive mechanism with threaded shafts connectable at the same end and parts oriented such that the shafts move in the same direction at the same rate and height.
Figure 10B:
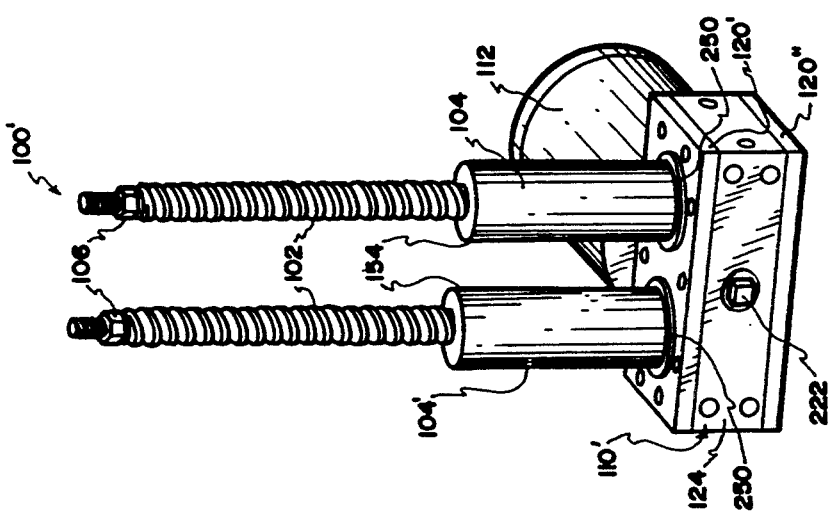
FIG. 10B is a perspective of the dual drive mechanism of FIG. 10A with threaded shafts connectable at the same end and moving in showing the common length of displacement of the shafts at a change in height.

In FIGS. 10A and 10B, comprising another embodiment of the invention, dual drive mechanism 100' comprises a housing 110' which has a first gear case cover plate 120' comprising a pair of bushings 250. A second gear case cover plate 120" seen in FIG. 10A inferiorly disposed to gear case cover plate 120' comprises a pair of bushings 252 (not seen in FIG. 10A, but seen in FIG. 11A). With the configuration of bushings 250 and 252 in plates 120' and 120", each hollow shaft 154 is disposed in the same direction in housing 110'. Dual drive mechanism 100' comprises two different shaft drive assemblies 104 and 104'. All parts of shaft drive assembly 104' are identical with parts of shaft drive assembly 104, except that gear nut 156 of shaft drive assembly 104' is rotated 180° relative to the orientation of gear nut 156 in shaft drive assembly 104. So assembled, dual drive mechanism 100' drives each of the two threaded shafts 102 in the same direction at essentially the same rate as seen in combination in FIGS. 10A and 10B to provide twice the lift capacity of a singly driven threaded shaft 102. Housing 110' is generally securely affixed to part of a chair 10 in this case and is not normally a moving part.

Another embodiment of the invention, dual drive mechanism 100", comprises housing 110' and a pair of shaft drive assemblies 104 disposed in a common direction relative to housing 110' as seen in FIGS. 11A and 11B. So disposed, each shaft drive assembly 104 is rotated in a direction opposite to the other shaft drive assembly 104 and, as a consequence, each threaded shaft 102 is also driven in an opposite linear direction from the other threaded shaft 102. As seen in FIG. 11A, at one point each end 106 of each threaded shaft 102 is disposed in a plane 294 equidistant from housing 110'. Being so oriented and being driven in opposite directions, rotational drive of motor 112 causes plane 294, commonly comprising each end 106 and shown as dashed lines in FIGS. 11A and 11B, to be tilted. If motor 112 is driven in forward and reverse cycles, plane 294 and, resultingly, a chair part affixed to ends 106 are rocked.

Figure 12:
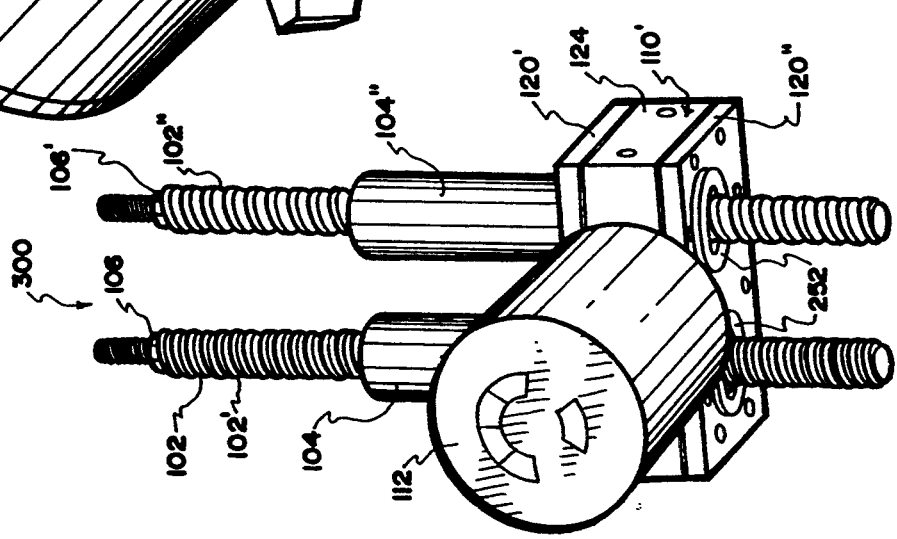
FIG. 12 is a perspective a dual drive mechanism like the one seen in FIG. 11A but with shafts having differently sized threads.

In yet another embodiment of the invention seen in FIG. 12, dual drive mechanism 300 comprises housing 110', first shaft drive assembly 104 and second shaft drive assembly 104". Shaft drive assembly 104 comprises components parts as described above. Shaft drive assembly 104" differs from shaft drive assembly 104" as result of a different pitch on threaded shaft 102" than the pitch on threaded shaft 102. Each gear nut (not shown in FIG. 12) comprises a complementary pitch to the pitch of each associated thread shaft. Providing threaded shafts having different pitches within the same dual drive mechanism 300 permits one shaft to be driven at a different rate relative to the other shaft.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A dual drive mechanism for use in a medical/dental chair comprising:
a housing;
motor means integrally connected to said housing and comprising an axle and gear means attached to the axle and disposed within said housing;
first and second shaft drive assembly means, each said shaft drive assembly means comprising means residing within said housing for communicating with said gear means such that when said gear means rotate each said shaft drive assembly means likewise rotates;
first means for transferring rotational energy from said first shaft drive assembly means disposed within and rigidly affixed to said first shaft drive assembly means;
second means for transferring rotational energy from said second shaft drive assembly means disposed within and rigidly affixed to said second shaft drive assembly means;
first and second means for receiving said transferred rotational energy and for translating motion of said first and second energy transferring means from rotational motion to linear motion;
first and second means for respectively non-rotationally affixing said first and second motion receiving and translating means to a part of the medical/dental chair;
said first energy transferring means further being disposed to transfer energy in a first direction and said second energy transferring means further being disposed to transfer energy in a second direction which is 180° offset from said first direction.

2. In combination:
a dental, medical or like chair comprising a seat and first support structure directly below the seat;
floor-engaging second support structure;
a lift mechanism interposed between the first and second support structures, the lift mechanism comprising a motor, a drive train operatively connected to the motor and two generally vertical extending non-rotating threaded shafts operatively connected to the drive train at an intermediate site between upper and lower ends of each of the threaded shafts;
the upper end of one threaded shaft being non-rotatably connected to the first support structure of the chair and the lower end of the other threaded shaft being non-rotatably connected to the second support structure;
whereby operation of the motor actuates the drive train causing the threaded shafts to be generally vertically translated in opposite directions without material rotation of either threaded shaft to lift or lower the chair.

3. A combination according to claim 2 further comprising a shroud spanning and concealing space between the first and second support structures.

4. A combination according to claim 3 wherein the shroud comprises telescopic sections which are relatively displaced as the threaded shafts are displaced.

5. A combination according to claim 2 further comprising an interleafed sectionalized base spanning between the first and second support structures such that sections of the base are displaced as the threaded shafts are displaced.

6. A combination according to claim 5 wherein the sections of the base telescopically interrelate and are load-bearing.

7. A combination according to claim 2 wherein the drive train comprises an internally threaded sleeve threadedly engaging and selectively translating each threaded shaft.

8. A combination according to claim 2 wherein the drive train comprises at least one plastic nut and a juxtaposed encapsulated reservoir of lubricant for the plastic nut.

9. A combination according to claim 8 wherein the lubricant reservoir comprises a wick.

10. A combination according to claim 2 wherein the drive train engages the threaded shafts so as to drive them in the same direction at a selected point in time.

11. A combination according to claim 2 wherein the drive train engages the threaded shafts so as to drive them in opposite directions at a selected point in time.

12. In combination:
a dental, medical or like chair comprising seat structure comprising an underside directly below the seat;
floor-engaging support structure;
a lift mechanism interposed between the underside and the support structure, the lift mechanism comprising a motor, a drive train operatively connected to the motor and two generally vertical extending non-rotating threaded shafts operatively connected to the drive train at an intermediate site between upper and lower ends of each of the threaded shafts and spanning between the underside and the support structure;
whereby operation of the motor actuates the drive train causing the threaded shafts to be generally vertically translated without material rotation of either threaded shaft to lift or lower the chair.

13. A combination according to claim 12 wherein the upper end of only one threaded shaft non-rotatably connects to the underside of the seat and the lower end of the other threaded shaft non-rotatably connects to the floor engaging support structure.

14. A combination according to claim 12 wherein the upper end of both threaded shafts non-rotatably connect to the underside of the seat.

15. A combination according to claim 14 wherein the pitch of the threads of one threaded shaft differ from the pitch of the threads of the other threaded shaft whereby simultaneous displacement of the threaded shafts changes the orientation of a plane containing the seat of the chair.

16. A combination according to claim 12 wherein a threaded drive shaft interconnects the drive train and the motor, the threaded drive shaft being normally rotated by the motor when energized, the threaded drive shaft comprising an accessible distal end comprising structure by which the threaded drive shaft can be selectively manually rotated when the motor is not energized.

17. A combination according to claim 16 wherein the distal end structure of the threaded drive shaft comprises a slot to receive a screw driver or the like.

18. A combination according to claim 12 wherein the drive train comprises seriatim a worm gear, opposed helical gears respectively rotatably connected to the worm gear and spaced internally threaded sleeves one non-rotatably connected to each helical gear and rotatably connected to the respective threaded shafts.

19. A combination according to claim 12 wherein at least one of the threaded shafts comprise a jack screw.

20. In combination:
   a dental, medical or like chair comprising a seat and a connector beneath the seat;
   floor-engaging structure;
   a lift mechanism interposed between the connector and the floor-engaging structure for lifting and lowering the chair, the lift mechanism comprising a motor, a drive train operatively connected to the motor and two generally vertical extending non-rotating threaded shafts operatively connected to the drive train at an intermediate site between upper and lower ends of each of the threaded shafts such that two ends of the threaded shaft are exposed above and two below the drive train;
   one end of each threaded shaft being non-rotatably connected to one of the connector and the floor-engaging structure the other end of each threaded shaft being unattached.

21. In combination:
   a dental, medical or like chair comprising a seat;
   floor-engaging structure;
   a lift mechanism interposed between the seat and the floor-engaging structure, the lift mechanism being joined at one end to substructure of the seat and at another end to the floor-engaging structure, the lift mechanism comprising a motor, a drive train operatively connected to the motor and two generally vertical extending threaded shafts each operatively connected to the drive train at an intermediate site between upper and lower ends of each of the threaded shafts;
   whereby operation of the motor actuates the drive train causing the threaded shafts to be generally vertically translated to lift or lower the chair.

22. A displacement mechanism comprising:
   a motor comprising an output shaft,
   a drive train operatively connected to the output shaft of the motor, the drive train comprising two hollow power rotatable sleeves comprising internal threads, each sleeve surrounding an externally threaded shaft whereby rotation of the motor train rotates the sleeves and rotation of the sleeves substantially linearly translates the threaded shafts without material rotation thereof.

23. A displacement mechanism comprising:
   a motor;
   a drive train operatively connected to the motor for selective rotation;
   a pair of threaded shafts;
   the drive train comprising two internally threaded sleeves of synthetic resinous material, one sleeve being in threaded engagement with each threaded shaft.

24. A displacement mechanism according to claim 23 further comprising:
   a supply of encapsulated lubricant juxtaposed each sleeve.

25. A method of displacing the seat of a medical, dental or like chair comprising the steps of:
   energizing a motor;
   motor-actuating a drive train;
   non-rotatably translating two threaded shafts without substantial rotation responsive to drive train rotation to displace the seat from one position to another.

26. A method according to claim 25 wherein the threaded shafts are respectively translated in generally opposite directions.

27. A method according to claim 25 wherein the threaded shafts are respectively translated in generally the same direction.

28. A method according to claim 25 further comprising the step of continuously lubricating a plastic nut of the drive train from a substantially concealed lubricating source during rotation of the drive train.

29. A method of displacing the seat of a medical, dental or like chair comprising the steps of:
   non-rotatably connecting a top portion of at least one of two threaded shafts to an underside of the seat;
   energizing a motor;
   motor-actuating a drive train;
   translating two threaded shafts without substantial rotation responsive to drive train rotation to non-rotatably displace the seat from one position to another.

30. A method of displacing an object comprising the steps of:
   activating a motor which is operatively connected to drive train;
   rotating at least some parts of the drive train responsive to said motor activation;
   translating two thread shafts without substantial rotation responsive to said rotating step to non-rotatably displace the object from one position to another.

31. A method of displacing the seat of a medical, dental or like chair comprising the steps of:
   energizing a motor;
   rotating a drive train responsive to motor rotation;
   displacing two threaded shafts responsive to contiguous displacement of an internally threaded sleeve which surrounds each threaded shaft at a location between upper and lower shaft ends to displace the seat from one position to another.

* * * * *